(12) United States Patent
Kim

(10) Patent No.: US 8,388,478 B2
(45) Date of Patent: Mar. 5, 2013

(54) INPUT SHAFT FOR HYBRID TRANSMISSION

(75) Inventor: Wansoo Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 246 days.

(21) Appl. No.: 12/957,841

(22) Filed: Dec. 1, 2010

(65) Prior Publication Data

US 2012/0004062 A1  Jan. 5, 2012

(30) Foreign Application Priority Data

Jun. 30, 2010 (KR) .................... 10-2010-0062605

(51) Int. Cl.
*F16H 3/72* (2006.01)
*F16H 37/06* (2006.01)
*F16H 57/04* (2010.01)
*F16H 57/08* (2006.01)
*F16C 3/03* (2006.01)
*F16C 3/00* (2006.01)

(52) U.S. Cl. ............ 475/5; 475/159; 475/331; 464/167; 464/179

(58) Field of Classification Search .............. 475/5, 159, 475/331; 464/167, 179
See application file for complete search history.

(56) References Cited

U.S. PATENT DOCUMENTS

| | | | | |
|---|---|---|---|---|
| 3,080,774 A | * | 3/1963 | Nickerson et al. ............ | 475/143 |
| 3,165,946 A | * | 1/1965 | Wayman .......................... | 477/53 |
| 5,456,129 A | * | 10/1995 | Tane et al. ........................ | 74/467 |
| 6,358,173 B1 | * | 3/2002 | Klemen et al. .................... | 475/5 |
| 6,743,135 B2 | * | 6/2004 | Klemen et al. .................... | 475/5 |
| 7,854,675 B2 | * | 12/2010 | Grochowski .................. | 475/116 |
| 2006/0111213 A1 | | 5/2006 | Bucknor et al. | |
| 2010/0133930 A1 | | 6/2010 | Suzuki et al. | |

FOREIGN PATENT DOCUMENTS

| | | |
|---|---|---|
| JP | 7-76229 A | 3/1995 |
| JP | 2003-169448 A | 6/2003 |
| JP | 2004-306827 A | 11/2004 |
| JP | 2004-353780 A | 12/2004 |
| JP | 2008-126711 A | 6/2008 |
| JP | 2008-279916 A | 11/2008 |
| JP | 2010-6190 A | 1/2010 |

* cited by examiner

*Primary Examiner* — Tisha Lewis
(74) *Attorney, Agent, or Firm* — Morgan, Lewis & Bockius LLP

(57) ABSTRACT

An input shaft for a hybrid transmission that is used for the hybrid transmission equipped with a plurality of friction elements and at least two or more planetary gear sets receiving power from an engine and at least one or more motor generators, may include a first spline to which at least one of the motor generators may be connected, a second spline and a third spline to which rotary elements of the planetary gear sets may be connected, respectively, and a lubricant channel formed inside the input shaft to provide a channel for lubricant for lubricating parts of the transmission.

6 Claims, 3 Drawing Sheets

INPUT SHAFT FOR HYBRID TRANSMISSION

CROSS-REFERENCE TO RELATED APPLICATIONS

The present application claims priority to Korean Patent Application Number 10-2010-0062605 filed Jun. 30, 2010, the entire contents of which application is incorporated herein for all purposes by this reference.

BACKGROUND OF THE INVENTION

1. Field of the Invention

The present invention relates to an input shaft used for transmission mounted in hybrid vehicles to drive the vehicles by using at least two power sources, in more detail, a structure of an input shaft.

2. Description of Related Art

Hybrid vehicle generally implements various power transmission modes that are suitable for traveling conditions of the vehicles, using power from an engine and motors, and transmissions convert power received from the motors as well as the engine into appropriate power, in order to achieve this operation.

The transmissions are commonly equipped with an input shaft and an output shaft, in which a power source supplying power, such as an engine, is connected to the input shaft and the output shaft transmits output converted by the transmissions to the driving wheels.

In hybrid transmissions used in hybrid vehicles, power should be basically transmitted from the engine to the input shaft and power should be transmitted from at least one or more motors.

The transmissions should have a compact configuration to be easily mounted in the vehicles and reduce the weight, and it is preferable that the parts of the transmissions can implement various functions in order to achieve the configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an input shaft for a hybrid transmission which can receive power from at least two power sources, including an engine, and contribute to lubricating and operating the parts of the transmission.

In an aspect of the present invention, the input shaft for a hybrid transmission that may be used for the hybrid transmission equipped with a plurality of friction elements and at least two or more planetary gear sets receiving power from an engine and at least one or more motor generators may include a first spline to which at least one of the motor generators may be connected, a second spline and a third spline to which rotary elements of the planetary gear sets may be connected, respectively, and a lubricant channel formed inside the input shaft to provide a channel for lubricant for lubricating parts of the transmission.

The lubricant channel may be formed longitudinally through the center portion of the input shaft, and control pressure channels may be further formed longitudinally close to the lubricant channel in the input shaft to supply working hydraulic pressure to any one of the friction elements.

The control pressure channels may be formed symmetrically along a circumferential direction of the input shaft with the lubricant channel therebetween.

The at least one or more motor generators may include a first motor generator and a second motor generator, the at least two or more planetary gear sets may include a first planetary gear set and a second planetary gear set, the first motor generator may be connected to the third spline through the engine and the first planetary gear set, a rotor of the second motor generator may be directly connected to the first spline, and the second planetary gear set may be connected to an output shaft and the second spline.

The first planetary gear set may include a first sun gear, a first carrier, and a first ring gear, the first motor generator may be connected to the first ring gear, the engine may be connected to the first carrier, and the first sun gear may be engaged with the third spline, the second planetary gear set may include a second sun gear, a second carrier, and a second ring gear, and the second sun gear may be engaged with the second spline and the control pressure channels control a friction element that transmits/stops power between the second ring gear and the first carrier.

The first ring gear may be selectively connected to the first planet carrier by a friction element.

The second carrier may be connected to the output shaft.

The second ring gear may be selectively connected to a stationary member by a friction member.

In another aspect of the present invention, the input shaft for a hybrid transmission, may include a lubricant channel formed through an axial center of the input shaft to allow oil to pass therethrough, control pressure channels formed symmetrically with respect to the lubricant channel in parallel with the lubricant channel along a circumferential direction of the input shaft, and a plurality of splines formed axially at least three positions on the outer circumference of the input shaft to transmit torque.

The control pressure channels may have one end open to one end of the input shaft and the other end radially connected to the input shaft and open to the circumference of the input shaft.

The input shaft may be provided with, as power sources, an engine, a first motor generator, and a second motor generator, and used for the hybrid transmission equipped with a first planetary gear set and a second planetary gear set, the splines may include a first spline to which the second motor generator may be connected, a second spline to which one rotary element of the second planetary gear set may be connected, and a third spline to which one rotary element of the first planetary gear set may be connected.

The first planetary gear set may be a planetary gear assembly including a first sun gear, a first carrier, and a first ring gear, the second planetary gear set may be a planetary gear assembly including a second sun gear, a second carrier, and a second ring gear, the second spline may be engaged with the second sun gear of the second planetary gear set, and the third spline may be engaged with the first sun gear of the first planetary gear set.

According to the exemplary embodiments of the invention, the input shaft for a hybrid transmission can receive power from at least two power sources, including an engine, and contribute to lubricating and operating the parts of the transmission, such that it may be possible to easily assemble motors of the transmission, stop direct vibration transmission between the motors and the input shaft, and reduce the entire size and weight.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
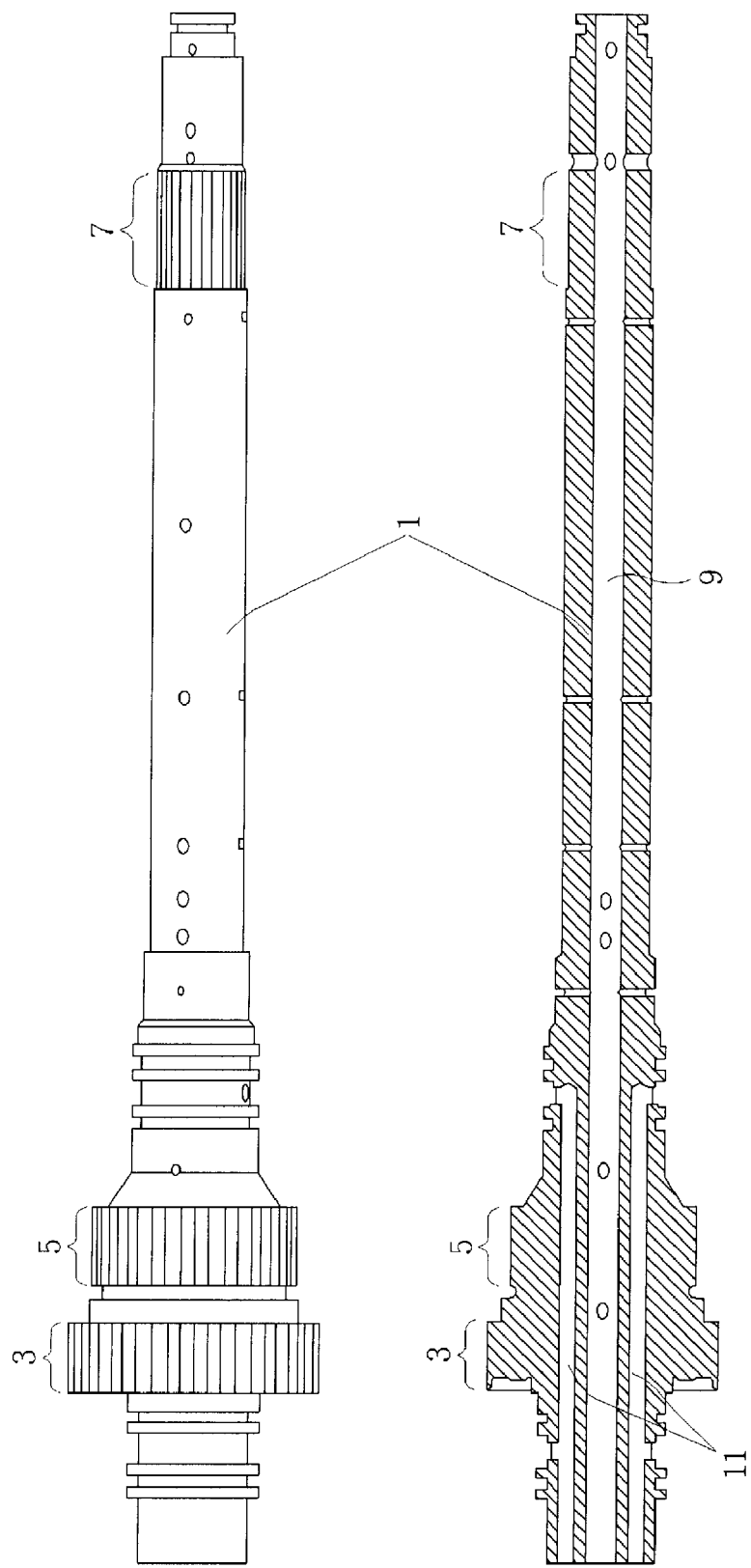
FIG. 1 is a diagram illustrating the configuration of the structure of an input shaft for a hybrid transmission according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
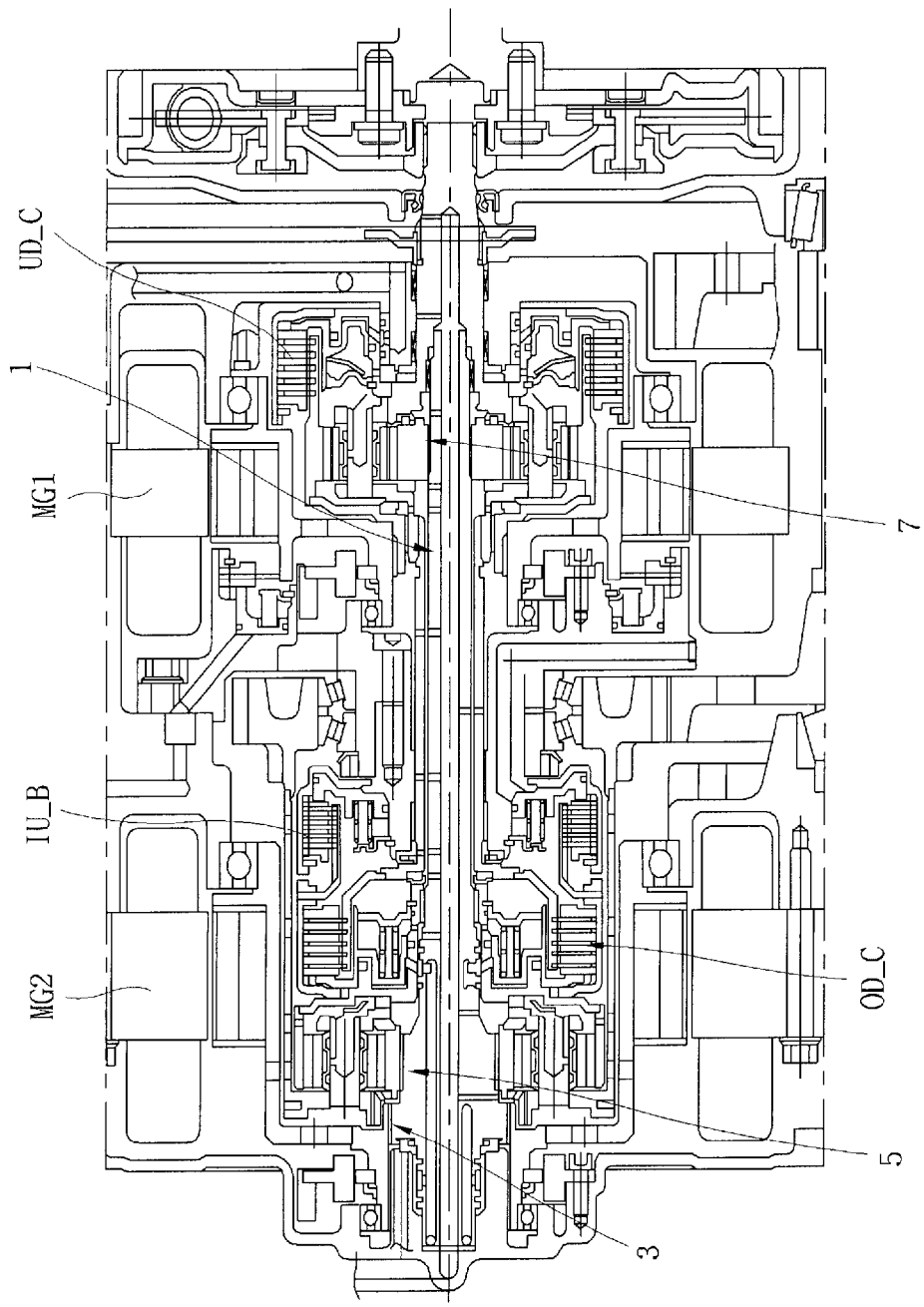
FIG. 2 is a view showing an example of the structure of a hybrid transmission equipped with the input shaft of the present invention.
Figure 3:
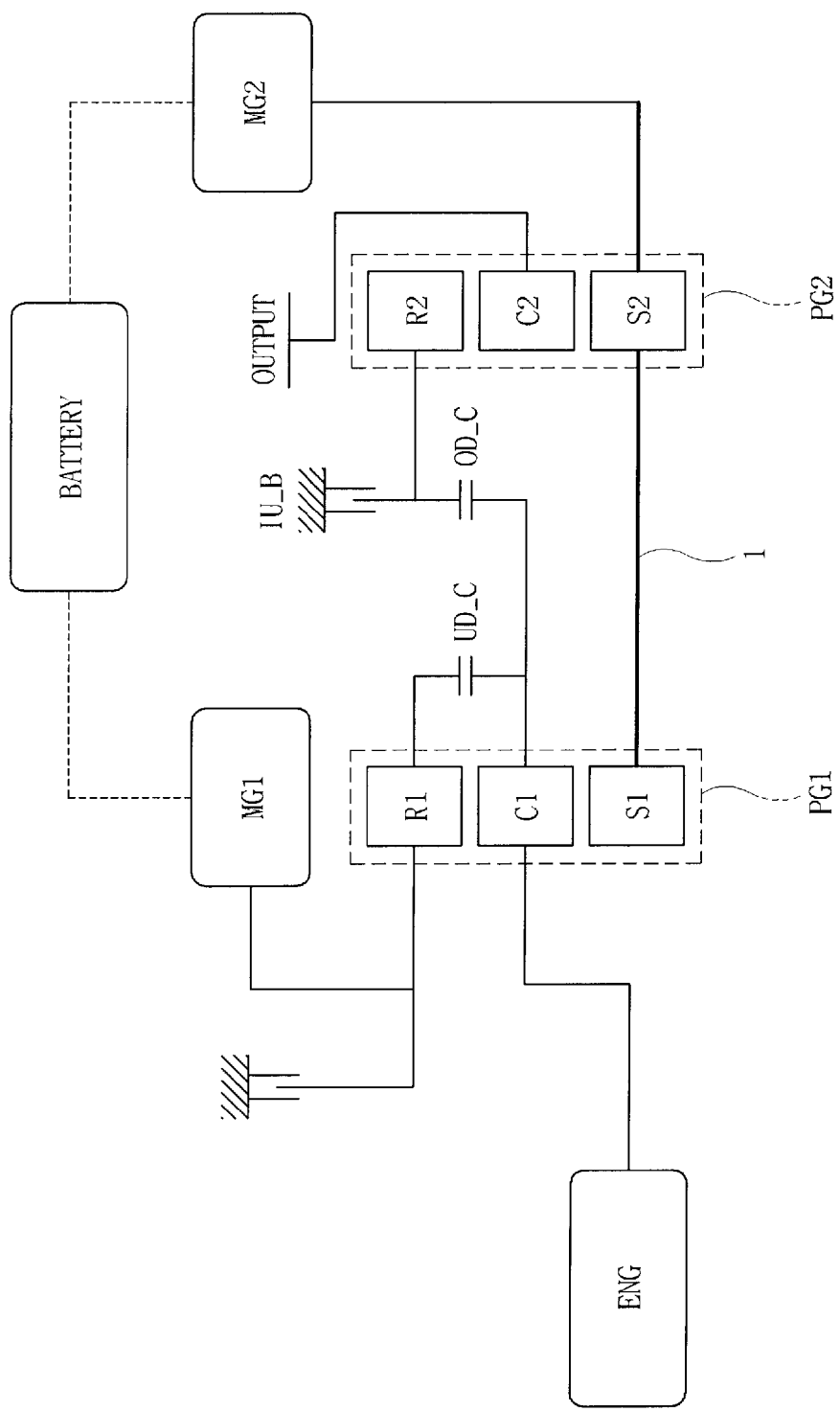
FIG. 3 is a diagram schematically illustrating the hybrid transmission shown in FIG. 2.

Referring to FIGS. 1 to 3, an exemplary embodiment of the present invention provides an input shaft 1 used for a hybrid transmission equipped with a plurality of friction elements and at least two or more planetary gear sets receiving power from an engine ENG and at least one or more motor generators. Input shaft 1 includes: a first spline 3 where at least one of the motor generators are connected, a second spline 5 and a third spline 7 where rotary elements of the planetary gear sets are connected, respectively, and a lubricant channel 9 formed inside to provide a channel for lubricant for lubricating the parts of the transmission.

Lubricant channel 9 is formed longitudinally through the center portion of input shaft 1 and control pressure channels 11 are further formed longitudinally close to lubricant channel 9 in input shaft 1 to supply working hydraulic pressure to any one of the friction elements.

The control pressure channels 11 are formed symmetrically with lubricant channel 9 therebetween.

That is, lubricant channel 9 is formed through the axial center of input shaft 1 and control pressure channels 11 are symmetrically formed from both sides of input shaft 1, such that rotational balance of input shaft 1 is maintained and hydraulic pressure can be easily controlled by control pressure channels 11.

Although control pressure channels 11 are symmetrically formed at both sides from lubricant channel 9, as in the exemplary embodiment, three or more may be formed symmetrically with respect to lubricant channel 9 or a second control pressure channel 11 may be symmetrically formed to control another friction element.

The one or more motor generators include a first motor generator MG1 and a second motor generator MG2. The at least two or more planetary gear sets include a first planetary gear set PG1 and a second planetary gear set PG2. First motor generator MG1 is connected to a third spline 7 through engine ENG and first planetary gear set PG1, a rotor of second motor generator MG2 is directly connected to first spline 3, and second planetary gear set PG2 is connected to an output shaft OUTPUT and a second spline 5.

First planetary gear set PG1 includes a first sun gear S1, a first carrier C1, and a first ring gear R1, in which first motor generator MG1 is connected to first ring gear R1, engine ENG is connected to first carrier C1, first sun gear S1 is engaged with third spline 7, and second planetary gear set PG2 includes a second sun gear S2, a second carrier C2, and a second ring gear R2, in which second sun gear S2 is engaged with second spline 5, second carrier C2 is connected with output shaft OUTPUT, and control pressure channel 11 is connected to control a friction element OD_C that transmits/stops power between second ring gear R2 and first carrier C1.

The first ring gear R1 may be selectively connected by a friction element UD_C to the first carrier C1. The second carrier C2 may be connected to the output shaft OUTPUT. The second ring gear R2 may be selectively connected by a friction element IU_B to a stationary member such as a transmission housing.

In the hybrid transmission having the above configuration, the rotor of second motor generator MG2 is engaged with first spline 3 formed on input shaft 1, and first motor generator MG1 and engine ENG are connected with first ring gear R1 of first planetary gear set PG1 by first carrier C1, that is, engaged with third spline 7 of input shaft 1 through first sun gear S1, such that the motor generators can be easily connected by the splines and direct power transmission between the motor generators and input shaft 1 is stopped.

Further, since lubricant channel 9 and control pressure channels 11 are formed in input shaft 1, as described above, it is possible to achieve a compact configuration of the transmission by simplifying the internal structure of the transmission and reduce the weight of the transmission.

On the other hand, the above exemplary embodiment of the present invention may be described in another way as follows. Input shaft 1 of an exemplary embodiment of the present invention includes: lubricant channel 9 formed through the axial center to allow oil to pass, control pressure channels 11 formed symmetrically with respect to lubricant channel 9 in parallel with lubricant channel 9, and a plurality of splines 3, 5, 7 formed axially at least three positions on the outer circumference to transmit torque.

In this configuration, control pressure channel 11 has one end open to one end of input shaft 1 and the other end radially connected to input shaft 1 and open to the circumference of input shaft 1.

Input shaft 1 is provided with, as power sources, engine ENG, first motor generator MG1, and second motor generator MG2, and used for a hybrid transmission equipped with first planetary gear set PG1 and second planetary gear set PG2.

The splines include first spline 3 where second motor generator MG2 is connected, second spline 5 where one rotary element of second planetary gear set PG2 is connected, and third spline 7 where one rotary element of first planetary gear set PG1 is connected.

In this configuration, first planetary gear set PG1 is a planetary gear assembly including first sun gear S1, first carrier C1, and first ring gear R1, second planetary gear set PG2 is a planetary gear assembly including second sun gear S2, second carrier C2, and second ring gear R2, second spline 5 is engaged with second sun gear S2 of second planetary gear set PG2, and third spline 7 is engaged with first sun gear S1 of first planetary gear set PG1.

For convenience in explanation and accurate definition in the appended claims, the terms "inner" and "outer are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An input shaft for a hybrid transmission that is used for the hybrid transmission equipped with a plurality of friction elements and at least two or more planetary gear sets receiving power from an engine and at least one or more motor generators, the input shaft comprising:
    a first spline to which at least one of the motor generators are connected;
    a second spline and a third spline to which rotary elements of the planetary gear sets are connected, respectively; and
    a lubricant channel formed inside the input shaft to provide a channel for lubricant for lubricating parts of the transmission,
    wherein the lubricant channel is formed longitudinally through the center portion of the input shaft,
    wherein control pressure channels are further formed longitudinally close to the lubricant channel in the input shaft to supply working hydraulic pressure to any one of the friction elements,
    wherein the control pressure channels are formed symmetrically along a circumferential direction of the input shaft with the lubricant channel therebetween,
    wherein the at least one or more motor generators include a first motor generator and a second motor generator,
    wherein the at least two or more planetary gear sets include a first planetary gear set and a second planetary gear set,
    wherein the first motor generator is connected to the third spline through the engine and the first planetary gear set,
    wherein a rotor of the second motor generator is directly connected to the first spline, and
    wherein the second planetary gear set is connected to an output shaft and the second spline.

2. The input shaft for the hybrid transmission as defined in claim 1, wherein:
    the first planetary gear set includes a first sun gear, a first carrier, and a first ring gear, the first motor generator is connected to the first ring gear, the engine is connected to the first carrier, and the first sun gear is engaged with the third spline,
    the second planetary gear set includes a second sun gear, a second carrier, and a second ring gear, and
    the second sun gear is engaged with the second spline and the control pressure channels control a friction element that transmits/stops power between the second ring gear and the first carrier.

3. The input shaft for the hybrid transmission as defined in claim 2, wherein the first ring gear is selectively connected to the first planet carrier by a friction element.

4. The input shaft for the hybrid transmission as defined in claim 2, wherein the second carrier is connected to the output shaft.

5. The input shaft for the hybrid transmission as defined in claim 2, wherein the second ring gear is selectively connected to a stationary member by a friction member.

6. An input shaft for a hybrid transmission, comprising:
    a lubricant channel formed through an axial center of the input shaft to allow oil to pass therethrough;
    control pressure channels formed symmetrically with respect to the lubricant channel in parallel with the lubricant channel along a circumferential direction of the input shaft; and
    a plurality of splines formed axially at least three positions on the outer circumference of the input shaft to transmit torque,
    wherein the control pressure channels have one end open to one end of the input shaft and the other end radially connected to the input shaft and open to the circumference of the input shaft,
    wherein the input shaft is provided with, as power sources, an engine, a first motor generator, and a second motor generator, and used for the hybrid transmission equipped with a first planetary gear set and a second planetary gear set,
    wherein the splines include a first spline to which the second motor generator is connected,
    wherein a second spline to which one rotary element of the second planetary gear set is connected,
    wherein a third spline to which one rotary element of the first planetary gear set is connected,
    wherein the first planetary gear set is a planetary gear assembly including a first sun gear, a first carrier, and a first ring gear,
    wherein the second planetary gear set is a planetary gear assembly including a second sun gear, a second carrier, and a second ring gear,
    wherein the second spline is engaged with the second sun gear of the second planetary gear set, and
    wherein the third spline is engaged with the first sun gear of the first planetary gear set.

* * * * *